United States Patent [19]

Mitani et al.

[11] 4,213,583

[45] Jul. 22, 1980

[54] REEL DRIVE MOTOR CONTROL SYSTEM FOR CASSETTE/CARTRIDGE TAPE RECORDERS

[75] Inventors: Akira Mitani; Isao Sanguu, both of Tokyo, Japan

[73] Assignee: Nippon Electric Co., Ltd., Tokyo, Japan

[21] Appl. No.: 928,777

[22] Filed: Jul. 28, 1978

[30] Foreign Application Priority Data

Jul. 29, 1977 [JP] Japan ............................... 52-91735

[51] Int. Cl.$^2$ .................... G11B 15/54; G11B 15/30
[52] U.S. Cl. ............................. 242/186; 242/75.51; 242/191; 318/6
[58] Field of Search ............. 242/186, 190, 191, 75.51; 318/6, 7, 163; 360/50, 73

[56] References Cited

U.S. PATENT DOCUMENTS

| | | | |
|---|---|---|---|
| 3,806,061 | 4/1974 | Kollar et al. | 242/186 |
| 3,834,648 | 9/1974 | Rose, Jr. et al. | 242/186 |
| 3,982,160 | 9/1976 | Goldschmidt et al. | 318/7 |
| 3,984,868 | 10/1976 | Ragle et al. | 360/73 |
| 4,015,177 | 3/1977 | Martins | 318/7 |
| 4,125,881 | 11/1978 | Eige et al. | 360/50 |

Primary Examiner—George F. Mautz
Attorney, Agent, or Firm—Hopgood, Calimafde, Kalil, Blaustein & Lieberman

[57] ABSTRACT

A tape transport control system suitable for use in tape recording apparatus which utilizes supply and take-up reels onto which the tape is wound. The control system is coupled to both the supply and take-up reels so as to generate detection signals which represents the rotation of the reels. The circuitry utilizes the detection signals to determine the point at which each of the reels in nearing its end, and sends a control signal to the tape transport circuitry to stop the rotation of the reels.

4 Claims, 6 Drawing Figures

REEL DRIVE MOTOR CONTROL SYSTEM FOR CASSETTE/CARTRIDGE TAPE RECORDERS

The present invention relates to a reel drive motor control system for cassette type-and/or cartridge-type tape recorders for audio, video, or data signals.

In a cassette/cartridge tape recorder for audio signals, a leader tape of transparent or metal-coated material is attached to each of the front and rear ends of the magnetic tape so that the ends may be photoelectrically or electrically sensed to generate a control signal to stop the reel drive motor before the tape end comes off the reel at the end of forward or backward drive.

This approach is not applicable to a tape recorder of the rotary transducer head type such as a video tape recorder, because the non-uniformity in the tape, i.e., the change from an ordinary magnetic tape to a leader tape or vice versa, adversely affects or even irreparably damages the rotary head, which stays in high speed rotation while the tape is being transported. It is therefore customary to start the rotation of the head only after the ordinary tape is wrapped around the drum which includes the head assembly. Even if the head-leader tape contact can be avoided at the start of the drive in the above-mentioned manner, a timely stoppage of the tape to avoid the same contact is not assured at the end of the drive, forward or backward. Particularly when the video tape recorder is in the fast rewind mode, the head tends to run beyond the end of the ordinary magnetic tape portion because of the inertia of the head assembly, even if the leader tape is correctly sensed.

It is therefore an object of the present invention to provide a reel drive motor control system for a cassette/cartridge tape recorder of the rotary head type, capable of stopping the reel before the leader tape reaches the head assembly nearly at the end of the forward or backward drive of the tape.

According to the present invention, there is provided a reel drive motor control system of this kind, in which the signal for controlling and stopping the reel drive motor toward the rear or front end of the tape is extracted through the calculation of the ratio between the rotational speeds of the take-up and supply reels, without resorting to the leader tape sensing.

The present invention is based on the fact that the length of the tape encased in a cassette or a cartridge is prefixed and that the rotational speed of the supply or take-up reel is in direct proportion to the length of the tape actually wound on the reel whereby the front or rear end of the tape can be predicted through the calculation of the above-mentioned speed ratio.

The features and advantages of the present invention will become more apparent from the following detailed description taken in conjunction with the accompanying drawings, wherein.

It is assumed in the description of the embodiment that the tape recorder to which the invention is applicable is a cartridge type video tape recorder having a rotary head. However it should be noted that the embodiment is usable as a recording reproducing equipment for audio and data signals as well.

Figure 1:
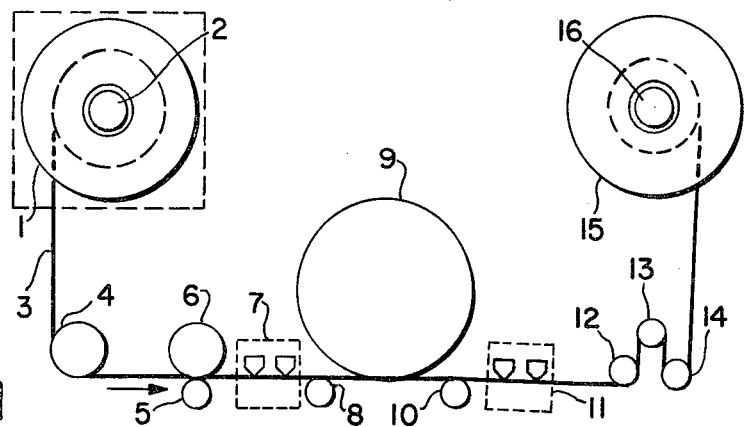
FIG. 1 is a schematic plan view of a cartridge video tape recorder to which the present invention is applicable.

Referring to FIG. 1, a cartridge type supply reel 1 of the video tape recorder is rotated with its center fixed to a rotary shaft 2. In normal recording or reproducing mode, a magnetic tape 3 wound on the supply reel 1 is transported at a constant speed in the direction indicated by an arrow, due to the pulling force exerted on the tape by a capstan roller 5 driven by a capstan motor (not shown) and a pinch roller 6. A guide roller 4 is disposed between the reel 1 and a capstan roller 5 for the redirection of the tape 3. After passing through a first audio head 7 and a guide post 8, the tape 3 runs along the outer cylindrical surface of a drum 9. The tape coming out of the drum 9 passes through an outlet guide post 10, a second audio head 11, a set of three guide rollers 12, 13 and 14, and is wound on a take-up real 15 mounted within the tape recorder apparatus. The guide roller 13 may be mounted on a tension arm (not shown) to maintain a suitable tension in the tape 3. The drum 9 includes a rotary disc and video heads mounted onto the outer circumference thereof and adapted to be brought in contact with the magnetic tape 3.

Figure 2:
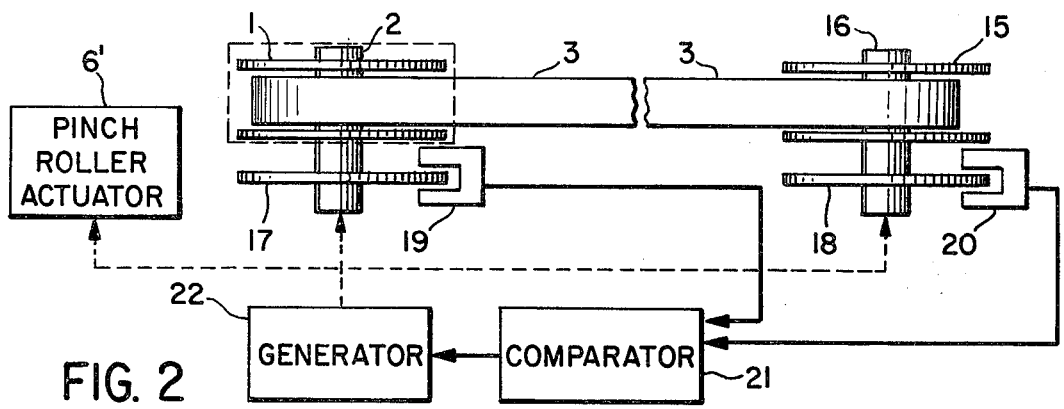
FIG. 2 shows a schematic side view of a supply reel and a take-up reel together with rotational speed detectors, and other structural elements in blocks.

In FIG. 2, on the rotary shaft 2 for the supply reel 1 is provided a rotary disc 17, while on a rotary shaft 16 for the take-up reel 15 is provided a rotary disc 18. A series of small apertures are formed at an equal interval along the circumferential portion of each of the rotary discs 17 and 18, with photodetector-emitter combinations 19 and 20 disposed facing the aperture. It will be seen that the combination of the disc 17 and the photo-emitter-detector 19 forms an optical tachometer for the supply reel 1, while that of the disc 18 and emitter-detector 20 another optical tachometer for the take-up reel 15.

The outputs of the detectors 19 and 20 are fed to a comparator 21, whose output is converted to a control signal at a control signal generator 22 to control the rotation of the rotary shafts 2 and 16 for the supply and take-up reels 1 and 15. The mechanical control effected onto to shafts 2 and 16 is shown by dotted lines in the drawing. The same mechanical control is applied to the pinch roller actuator 6' to release the pinch roller 6 at the end of the forward drive.

It will be seen in FIG. 2 that the rates of pulses generated at each of the detectors 19 and 20 are in direct proportion to the to the rotational speeds of the reels 1 and 15, respectively. Therefore, the comparison of the rates of pulses fed from these detectors gives information on the amount of tape wound on each of the supply and take-up reels 1 and 15.

The comparison of the speeds represented by the pulse rate to generate the reel control signal will now be described in more detail. First, the radial length from the center rotary shaft 2 or 16 to the outer circumference of the tape wound on the reel will be called hereunder "reel rotation radius". Representing the reel rotation radius of the supply reel 1 by $\gamma_s$, the speed of rotation of the same by $N_s$, the reel rotation radius of the take-up reel 15 by $\gamma_t$, the speed of rotation of the same by $N_t$, and the velocity of the transportation of the tape by V, the following relations are fulfilled:

$$N_s = V/2\pi\gamma_s \tag{1}$$

$$N_t = V/2\pi\gamma_t \tag{2}$$

Accordingly, the ratio of speeds of rotation between the supply reel 1 and the take-up reel 15 is represented by;

$$N_s/N_t = \gamma_t/\gamma_s \tag{3}$$

Assuming now that the inner radius of a reel is represented by a and the length from the center of the rotary shaft to the outer circumference of the tape wound fully around the reel is represented by b, then the reel rotation radius $\gamma_s$ of the supply reel 1 varies from b to a as the tape is transported from the supply reel 1 to the take-up reel 15, while the reel rotation radius $\gamma_t$ of the take-up reel 15 varies from a to b. Accordingly, at the beginning of the take-up of the tape by the reel 15, the following relation is fulfilled:

$$N_s/N_t = a/b \tag{4}$$

Similarly, at the end of the recording/reproducing mode with the reel 15 filled up with the tape, the following relation is satisfied:

$$N_s/N_t = b/a \tag{5}$$

The same relations apply to the end of the fast-forward or fast-rewind mode of operation.

To stop the transportation of the tape well before the end of the tape comes off the reel or before the end of the magnetic-material-coated portion of the tape reaches the drum 9, the values a and b cannot be used as they are. They must be modified values a' and b' to allow the margins at the tape end as mentioned above. More definitely, with the value a' made a little greater than a and with b' a little smaller than b, the point on the tape where $N_s/N_t = a'/b'$ is fulfilled gives the starting point for the recording/reproducing mode, while the point where $N_s/N_t = b'/a'$ is fulfilled gives the tape end point to stop the same mode. The same applies to the start and end points of the fast-forward and fast-backward mode.

Figure 3:
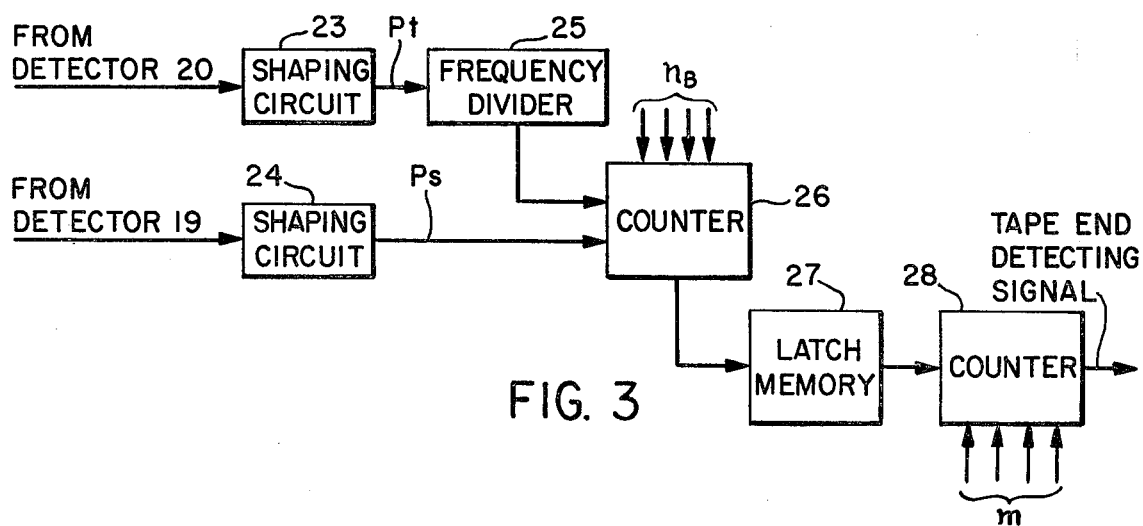
FIG. 3 shows in blocks a part of the structure shown in FIG. 2.

Referring to FIG. 3, the pulses fed from the detectors 20 and 19 (FIG. 2) are shaped at pulse shaping circuits 23 and 24, respectively. The output of the shaping circuit 23 will be called "take-up reel pulses" $P_t$, hereunder, while that of the shaping circuit 24 "supply reel pulses" $P_s$. The pulses $P_t$ are frequency-divided by a factor of $1/\eta_A$ at a frequency-divider 25. A counter 26 supplied with the supply reel pulses $P_s$ as clock pulses determines whether the number of the pulses $P_s$ inputed during the repetition period of the output pulses from the divider 25 is larger or smaller than $\eta_B$ ($\eta_B/\eta_A = b'/a'$). When it reaches $\eta_B$, a pulse is fed to a latch memory 27 to set it, from which a detection signal indicating that the above-mentioned tape end condition ($N_s/N_t = b'/a'$) has been satisfied is derived. In response to this detection signal, a tape end detection signal is produced at the counter 28. In the arrangement of FIG. 3, if the take-up reel pulses $P_t$ and the supply reel pulses $P_s$ are interchanged, that is, if the pulses $P_s$ are fed to the frequency-divider 25 and the pulses $P_t$ are used as the clock pulses to the counter 26, then from the latch memory 27 is derived a detection signal indicating that the above-mentioned condition for the start point for the recording/reproducing mode is satisfied ($N_s/N_t = a'/b'$).

Figure 4:
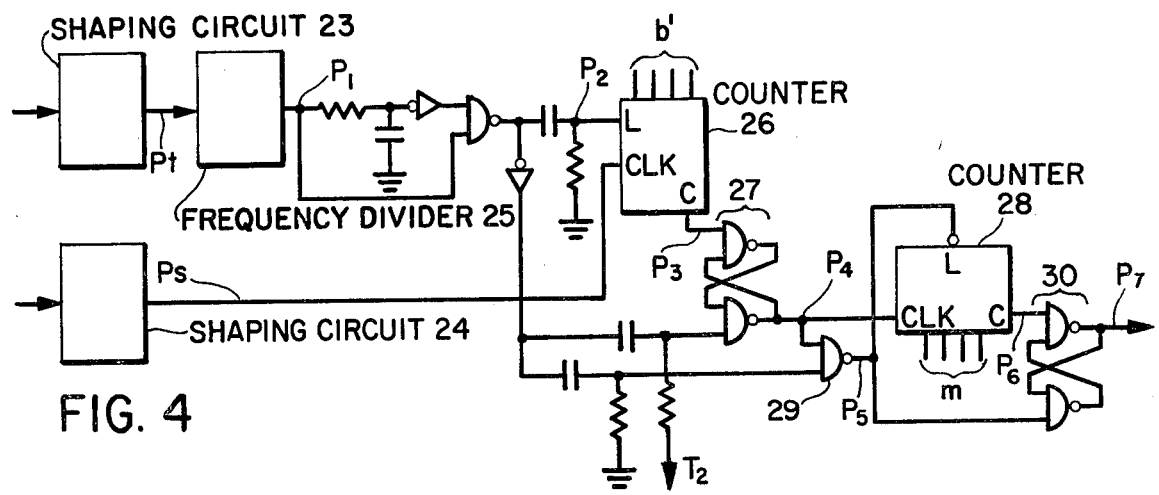
FIG. 4 is a circuit diagram partly in blocks showing the structure of FIG. 3 in more detail.

Now the control operation will be described in greater detail referring to FIGS. 4 and 5. It is assumed here that $\eta_A/\eta_B = 4/9$ is fulfilled. Referring to FIG. 4, the take-up reel pulses $P_t$ from the shaping circuit 23 are frequency-divided by a factor of $1/\eta_A$ (i.e., ¼) at the frequency-divider 25 to provide pulses $P_1$, which are then fifferentiated to provide differentiated pulses $P_2$ having a pulse width $\tau$. The counter 26, a 4-bit (0~15) counter in this case, is first loaded with a count value $\eta_B$ (i.e., 9) in response to the trailing edge of the differentiated pulse $P_2$, and continues to count down at the leading edges of the supply reel pulses $P_s$ serving as clock pulses. When the count value at the counter 26 reaches 0, a borrow pulse $P_3$ (the above-mentioned detection signal) is delivered. In other words, if the number of the pulses $P_s$ appearing during the time period $T_1$ (See FIG. 5) between the trailing and leading edges of neighbouring ones of the differentiated pulse $P_2$ is $\eta_B$ or more, the borrow pulse $P_3$ is delivered. The borrow pulse $P_3$ serves as a reset input for the latch memory 27. Since the latch memory 27 is periodically set by the trailing edge of each of the differentiated pulses $P_2$, a pulse $P_4$ having a pulse width $T_2$ is generated when the pulse $P_3$ appears. The pulse width $T_2$ varies depending upon the relation between the pulses $P_t$ and $P_s$. If the borrow pulse $P_3$ does not appear, the pulse $P_4$ is not generated.

The pulses $P_3$ representing that the tape end condition is satiffied is intermittent at the beginning and then it turns steady as the tape end comes closer. This is due to the fact that the generation of the pulses $P_3$ depends upon the phase relationship between the pulses $P_t$ and the pulses $P_s$, and that the generation of pulses $P_t$ and the pulses $P_s$ varies mutually independently as the tape is being transported. Therefore, to more precisely determine the detection of the tape end point, another counter 28 is provided behind the latch memory 27. In more detail, the detection of the tape end point is determined only when it has been detected by the counter 28 that a predetermined number of pulses $P_4$ are generated in succession. To that end, the counter 28 uses the pulses $P_4$ as clock pulses to provide a tape end signal when the count at the counter 28 reaches 0 from a predetermined number. Pulses $P_5$ for loading the counter 28 with the predetermined value m (for example, 10) are produced by a gate 29. The occurrence of the pulses $P_5$ is conditioned depending upon whether the leading edge of the differentiated pulse $P_2$ comes within the time interval $T_2$ where the pulse $P_4$ is at its lower level, and only in case where the leading edge of the pulse $P_2$ does not come within the time interval $T_2$ and where the count value m is loaded in the counter 28 in synchronism with the leading edge of the pulse $P_2$. As the count down at the counter 28 proceeds in response to the pulses $P_4$ serving as clock pulses, when it has been counted down from m to 0, a borrow output $P_6$ is fed to a latch memory 30. An output $P_7$ from the latch memory 30 serves as a tape end detection signal.

Figure 5:
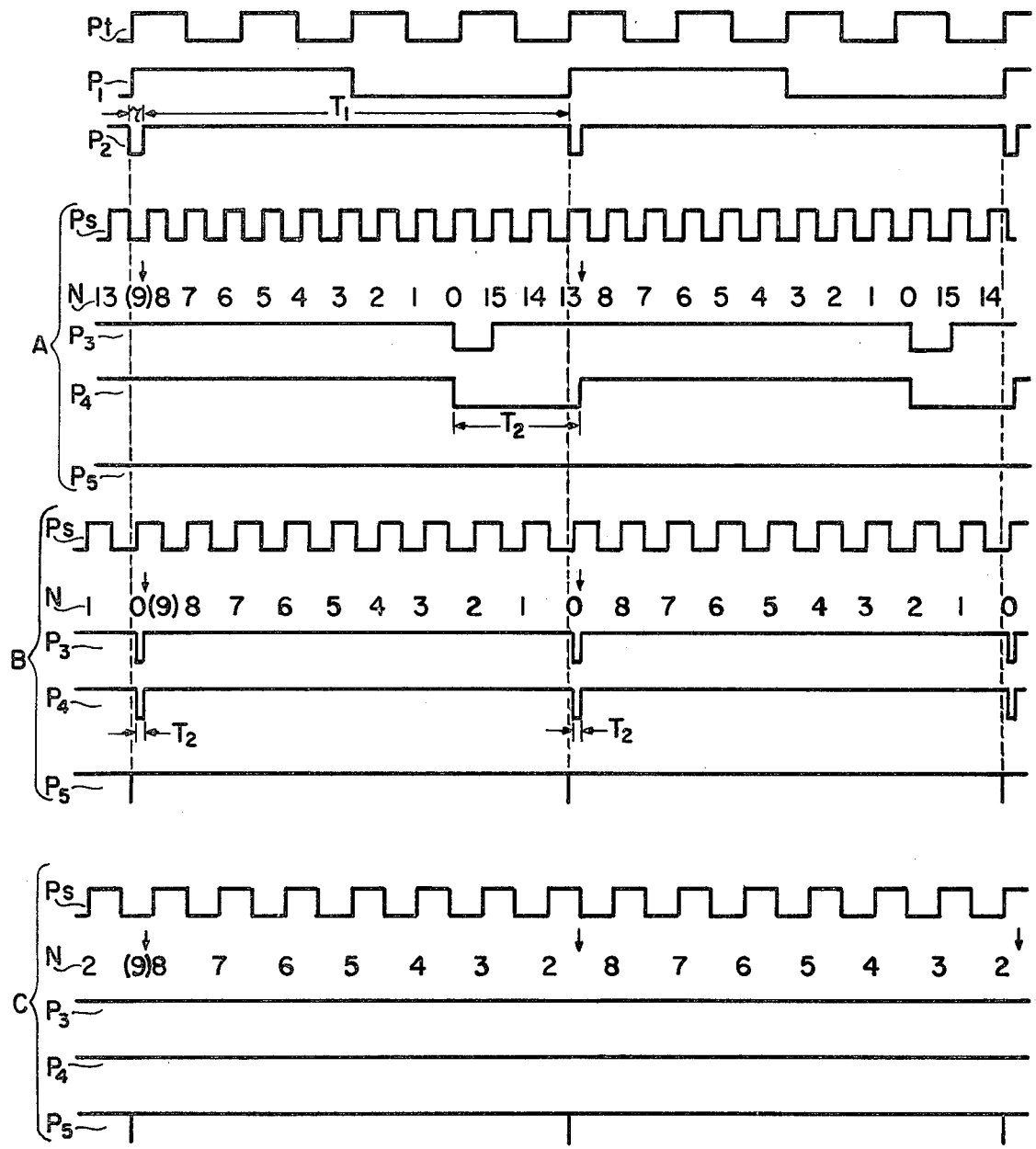
FIG. 5 is a time chart for explaining the operation of the structure of FIG. 3.

Referring to FIG. 5 showing the time chart of various pulses, three different cases A, B and C are illustrated depending upon the width of the pulse $P_4$. In the present invention, the change in the repetition period of the pulses $P_s$ results in the change in that of the pulses $P_t$. However, in the example shown in FIG. 5, the three cases are illustrated as mentioned above for convenience of explanation, by varying only the period of the pulses $P_s$ while maintaining the period of the pulses $P_t$ constant. FIG. 5A shows the case where more than 9 pulses $P_s$ appear within the period $T_1$ to enable the tape end detection to be made. In FIG. 5A, the pulses $P_s$, $P_3$ and $P_4$ are those described above. The reference character N represents the value of the count at the counter 26, which is loaded with the count value 9 at an arrowed point. In the first case shown in FIG. 5A, since the leading edge of the pulse $P_2$ comes within the period $T_2$, the differentiated pulse representing the leading edge of the pulse $P_2$ is inhibited by the gate 29, so that each time the pulse $P_4$ enters the counter 28, it counts down until the count value is reduced to 0, producing the borrow output $P_6$. At this moment, the tape end point has been detected. In the second case illustrated in FIG. 5B, 9 pulses $P_s$ appear within the period $T_1$, but the borrow output from the counter 26 comes within the pulse width $\tau$ of the pulse $P_2$. While the borrow outputs $P_3$ are generated from the counter 26, the pulses $P_4$ are derived from the latch memory 27. However since the pulse $P_5$ for loading the counter 28 with the count value m is generated, the borrow output $P_6$ cannot be obtained from the counter 28, and the detection of the tape end point cannot be effected. FIG. 5C shows the third case where fewer than b' (9) pulses $P_s$ appear within the period $T_1$, and in this case also no borrow output $P_3$ is derived from the counter 26, preventing the detection of the tape end point. In practice, as the tape end point comes closer, the timing of the output signals varies in the sequence of FIG. 5C→FIG. 5B→FIG. 5A.

Figure 6:
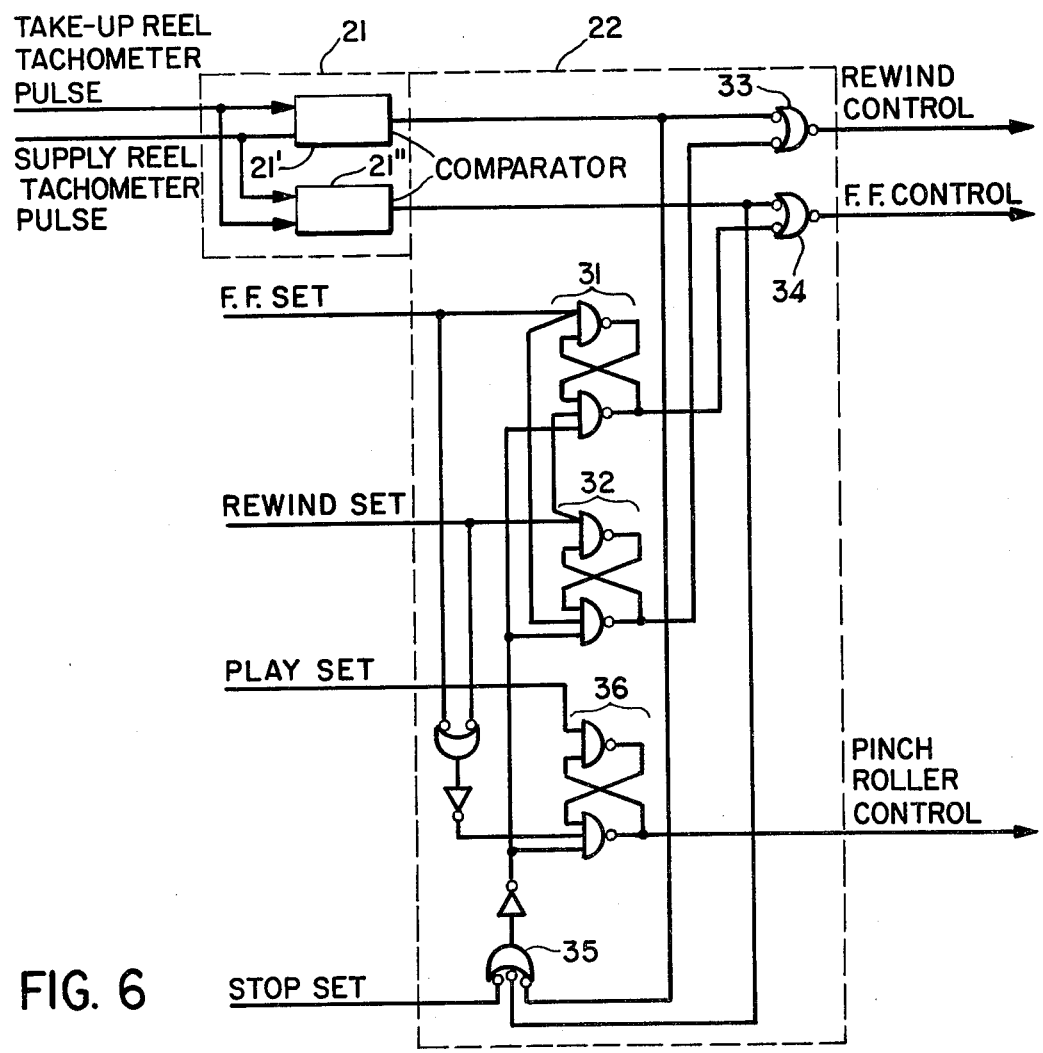
FIG. 6 shows in blocks another part of the structure shown in FIG. 2.

Referring to FIG. 6, showing a modification of the embodiment, reference numeral 21' denotes a comparator for detecting the tape end point as shown in FIG. 3, while numeral 21" denotes another comparator for detecting a start point for the post-rewinding recording-/reproducing mode. The comparators 21' and 21" are identical to each other except that the input connections to these comparators are reversed. The tape end detection signal is obtained from the comparator 21' in the above-described manner while the record start point detection signal is obtained from the comparator 21" similarly. The fast forward and fast rewind modes include a normal manual operation mode and automatic operation mode relying upon the comparators 21' and 21". In the manual operation mode, after the mode instruction for the fast forward mode or the rewind mode has been latched in a latch memory 31 or 32, the instruction is sent as a reel motor control signal to the reel motors via a gate 33 or a gate 34. Similarly, the instruction is sent to the pinch roller control 6' from the latch 36 as shown. In the illustrated embodiment, a stop mode is the state where every mode instruction has been released. For instance, when a fast forward is set in the manual mode, a fast forward control signal is sent to the reel motors via the latch memory 31 and the gate 34. As the magnetic tape is transported from the supply reel, the tape end detection signal outputed from the comparator 21' releases the latch memory 31 via a gate 35, and the control is switched to the automatic control mode. In response to the tape end detection signal, a rewind control signal is delivered from the gate 33 to rewind the tape. At a certain rewound point where the tape end detection signal disappears, the control circuit is switched to a stop mode to bring the tape to a complete stop. Likewise, if the rewind mode is set in the manual operation mode, the rewind control signal is sent to the reel drive motors through the latch memory 32 and the gate 33. As the magnetic tape is wound on the supply reel 1, a record start detection signal outputed from the comparator 21" releases the latch memory 32 via the gate 35, the control is switched to the automatic control mode. In response to the start-point detection signal, a fast forward control signal is fed to the reel motors via the gate 34, and the tape is fed. At a certain forward point where the record start detection signal disappears, the control circuit is switched to a stop mode to bring the tape to a complete stop. As will be seen, the control is automatically changed from the manual mode to the automatic control mode to achieve the timely stop at the record start point or at the tape end point.

What is claimed is:

1. A tape transport control system for tape apparatus including a supply reel with a predetermined amount of tape wound thereon; a take-up reel arranged to wind up said tape as passed thereto from said supply reel, a transducer provided on a tape path between said supply and take-up reels, and means for transporting said tape, said control system comprising:
    (a) means coupled with said supply reel and said take-up reel for producing first and second detection signals respectively corresponding to the speed of rotation of said reels, said detection signals being in the form of pulses varying in frequency with the speed of rotation of said reels;
    (b) frequency divider means, said frequency divider means having an input and an output, said pulses from said second detection signal being input to said frequency divider means, said frequency divider means dividing said pulses by a predetermined amount $\eta_A$ to produce divided pulses;
    (c) counter means responsive to said divided pulses and a predetermined amount $\eta_B$ for counting said pulses from said first detection signal and for producing first control pulses each time the number of said pulses from said first detection signal during one repetition period of said divided pulses exceeds said amount $\eta_B$; and
    (d) control means responsive to said first control pulses for controlling said transporting means.

2. The control system as claimed in claim 1, wherein said control means include a latch memory.

3. The control system as claimed in claim 1, in which $\eta_B/\eta_A = b'/a'$, wherein a' equals the radius of a substantially empty said reel, wherein b' equals the radius of a substantially full said reel.

4. The control system as claimed in claim 1 wherein said control means include means responsive to said first control pulses for counting the number of said first control pulses and for producing a second control pulse when said number of said first control pulses exceeds a predetermined number.

* * * * *